United States Patent
Macias

(10) Patent No.: US 10,825,066 B2
(45) Date of Patent: Nov. 3, 2020

(54) SYSTEM AND METHOD FOR DISTRIBUTED, SECURE COMPUTING SYSTEM

(71) Applicant: GrainChain, Inc., McAllen, TX (US)

(72) Inventor: Luis Macias, McAllen, TX (US)

(73) Assignee: GrainChain, Inc., McAllen, TX (US)

(*) Notice: Subject to any disclaimer, the term of this patent is extended or adjusted under 35 U.S.C. 154(b) by 0 days.

(21) Appl. No.: 16/238,495

(22) Filed: Jan. 2, 2019

(65) Prior Publication Data

US 2019/0228447 A1 Jul. 25, 2019

Related U.S. Application Data

(60) Provisional application No. 62/628,719, filed on Feb. 9, 2018, provisional application No. 62/620,362, filed on Jan. 22, 2018.

(51) Int. Cl.
*G06Q 30/06* (2012.01)
*G06Q 20/40* (2012.01)
*G06Q 20/06* (2012.01)
*G01N 19/10* (2006.01)
*H04L 9/32* (2006.01)

(52) U.S. Cl.
CPC ........ *G06Q 30/0607* (2013.01); *G01N 19/10* (2013.01); *G06Q 20/065* (2013.01); *G06Q 20/405* (2013.01); *G06Q 30/0627* (2013.01); *H04L 9/3247* (2013.01); *H04L 2209/38* (2013.01); *H04L 2209/42* (2013.01); *H04L 2209/56* (2013.01)

(58) Field of Classification Search
CPC ........ G06Q 40/00; G06Q 40/04; G06Q 40/06; G06Q 30/00; G06Q 30/06; G06Q 30/08
USPC ..................................................... 705/35–37
See application file for complete search history.

(56) References Cited

U.S. PATENT DOCUMENTS 10,476,847 B1 * 11/2019 Smith ................. H04L 63/0407
2006/0224736 A1   10/2006 Graziado et al.
2008/0294488 A1   11/2008 Gupta et al.
(Continued)

FOREIGN PATENT DOCUMENTS

WO    2017199053 A1    11/2017

OTHER PUBLICATIONS

Mougayar ("The Blockchain is the New Database, Get Ready to Rewrite Everything", Brave new coin, Jan. 2, 2015, 7 pages, retrieved from https://bravenewcoin.com/insights/ the-blockchain-is-the-new-database-get-ready-to-rewrite-everything) (Year: 2015).*

(Continued)

*Primary Examiner* — Hani M Kazimi
(74) *Attorney, Agent, or Firm* — Norton Rose Fulbright US LLP

(57) ABSTRACT

A method for injecting data into a secure distributed computing system includes obtaining characteristics of an object via a secure operable connection from a smart silo. The method further includes verifying an identity of the smart silo based on credentials included in a message from the smart silo received via the secure operable connection. The method further includes making a determination that the characteristics match a trigger condition of a smart contract. The method further includes executing the smart contract in response to the determination.

20 Claims, 9 Drawing Sheets

(56) References Cited

U.S. PATENT DOCUMENTS

| | | |
|---|---|---|
| 2014/0114467 A1 | 4/2014 | Zimmerman |
| 2016/0260171 A1* | 9/2016 | Ford ................... G06Q 40/04 |
| 2016/0283941 A1* | 9/2016 | Andrade ............... H04L 9/3247 |
| 2017/0024818 A1* | 1/2017 | Wager ................... G06Q 40/04 |
| 2017/0085545 A1* | 3/2017 | Lohe ................... G06Q 20/389 |
| 2017/0140408 A1* | 5/2017 | Wuehler ............. G06Q 30/0207 |
| 2017/0279774 A1* | 9/2017 | Booz ................... G06Q 20/123 |
| 2018/0075406 A1* | 3/2018 | Kingston ......... G05B 19/41875 |
| 2018/0240107 A1* | 8/2018 | Andrade ................ G06Q 20/36 |
| 2018/0341910 A1* | 11/2018 | Broveleit ........... G06Q 10/0833 |
| 2019/0036887 A1* | 1/2019 | Miller .................... G06Q 20/06 |
| 2019/0057379 A1* | 2/2019 | Chalakudi ........... H04L 63/0823 |
| 2019/0188399 A1* | 6/2019 | Palaniappan ......... H04L 9/0618 |
| 2019/0188787 A1* | 6/2019 | Besanson Tuma ... H04L 9/0637 |
| 2019/0190719 A1* | 6/2019 | van de Ruit .......... H04L 9/3236 |
| 2019/0205870 A1* | 7/2019 | Kamalsky ............ G06Q 30/018 |
| 2020/0021439 A1* | 1/2020 | Sato ....................... G06Q 40/02 |
| 2020/0111092 A1* | 4/2020 | Wood ........................ G06F 9/44 |
| 2020/0167859 A1* | 5/2020 | Bell ...................... H04L 9/3239 |

OTHER PUBLICATIONS

Crosby et al., "BlockChain Technology: Beyond Bitcoin," Sutardja Center for Entrepreneurship & Technology Technical Report, Oct. 16, 2015, 35 pages.*

Sakamoto, "Bitcoin: A Peer-to-Peer Electronic Cash System," www.bitcoin.org, 2005, 9 pages.*

Rennock et al., Blockchain Technology and Regulatory Investigations. The Journal Litigation. Feb./Mar. 2018; 11 pages. Retrieved from the Internet: https://www.steptoe.com/images/content/1/7/v3/171269/LIT-FebMar18-Feature_Blockchain.pdf.*

Chaintrade, 'The First Blockchain-based Platform to Trade Food and Raw Materials', white paper v 0.82, Oct. 2017, (25 pages).

International Search Report issued in corresponding International application No. PCT/US2019/012112, dated May 1, 2019 (11 pages).

* cited by examiner

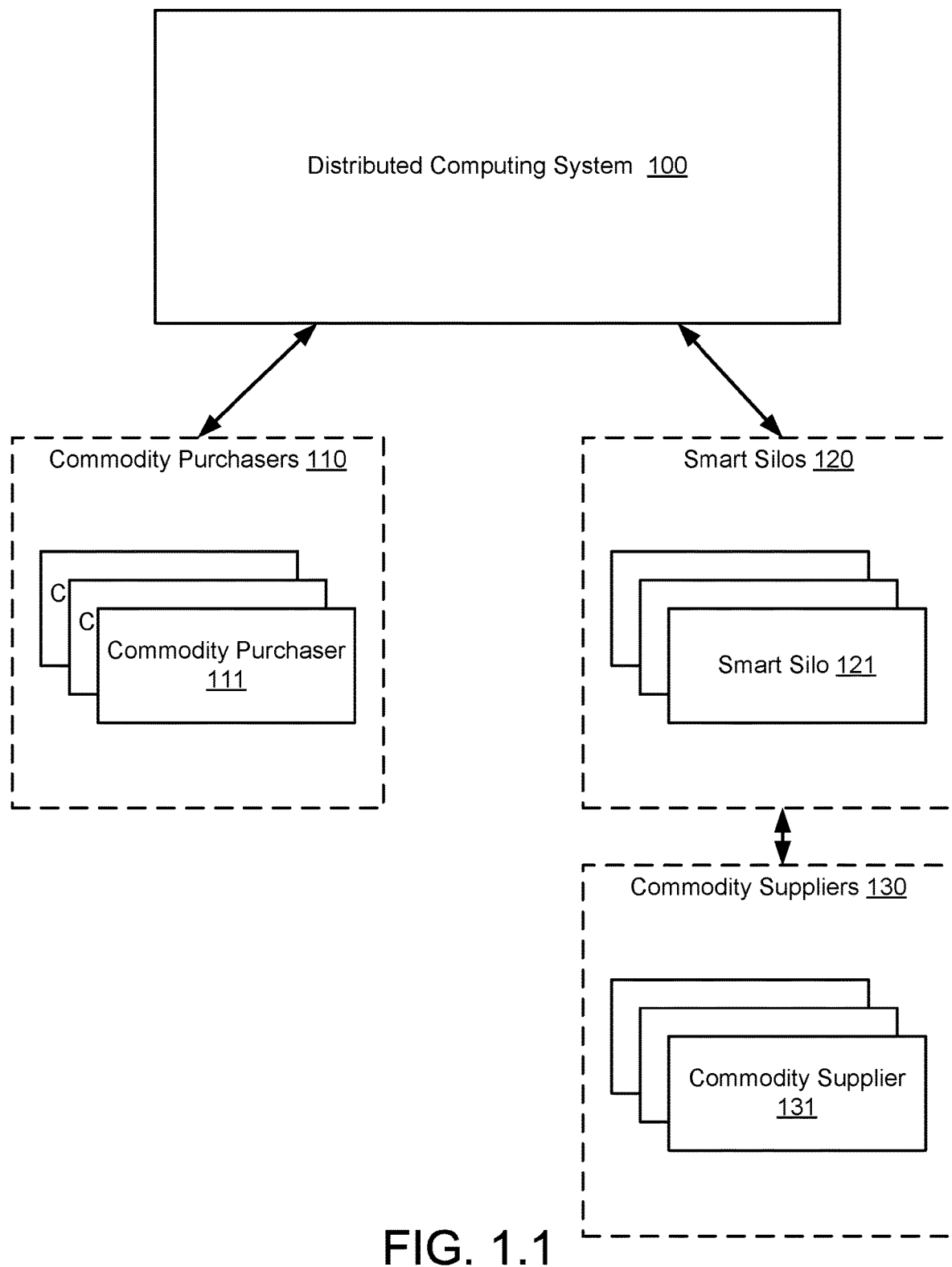
FIG. 1.1

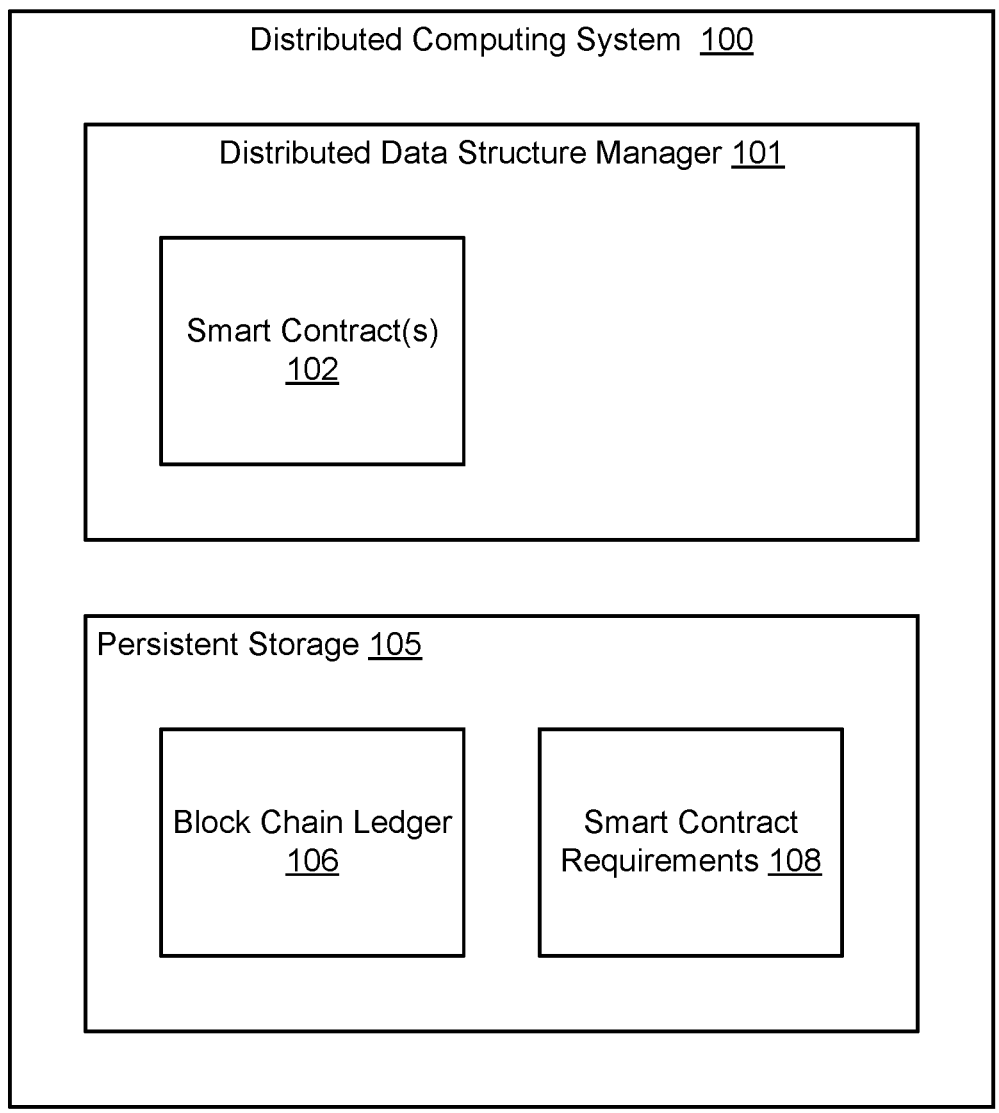
FIG. 1.2

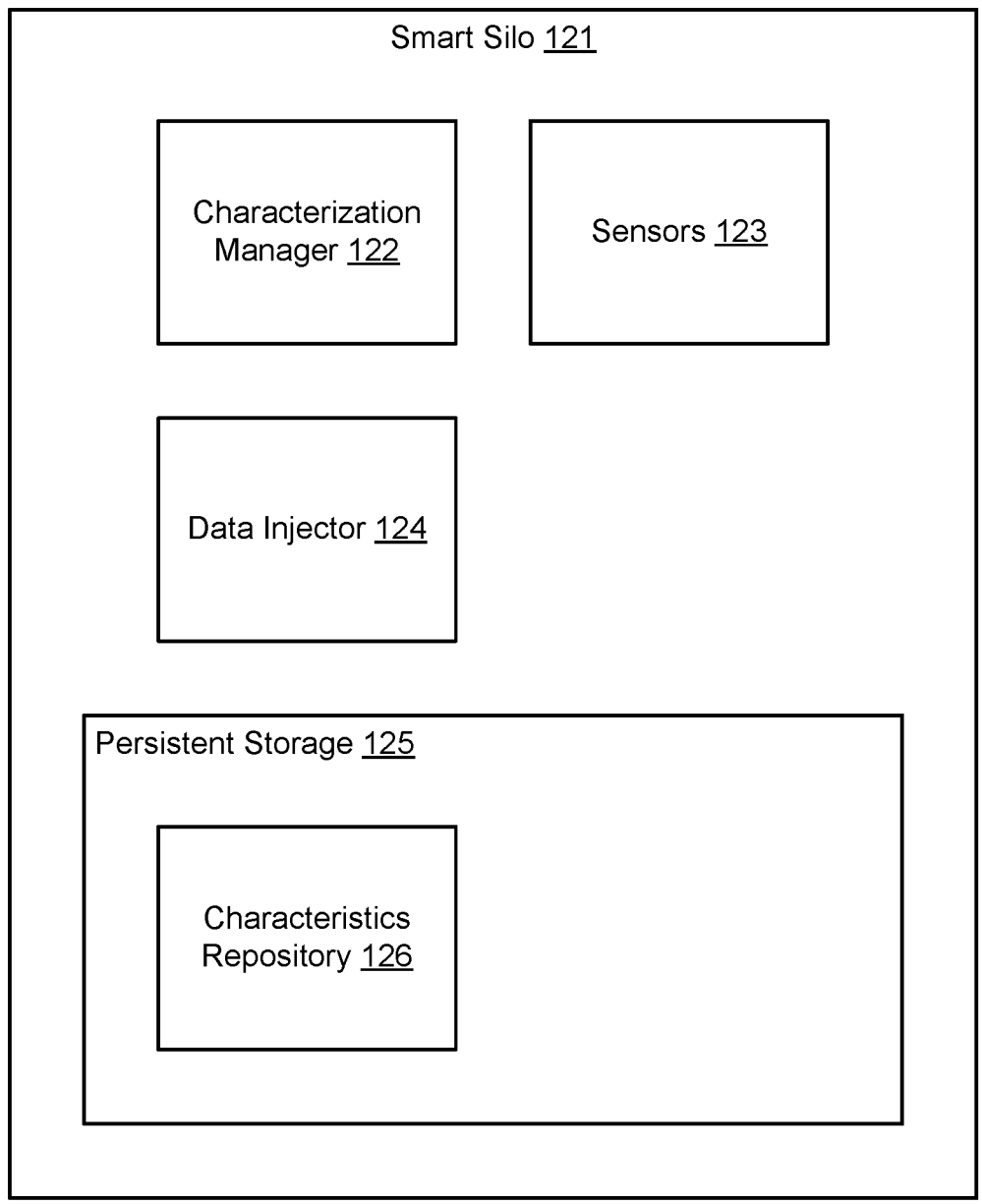
FIG. 1.3

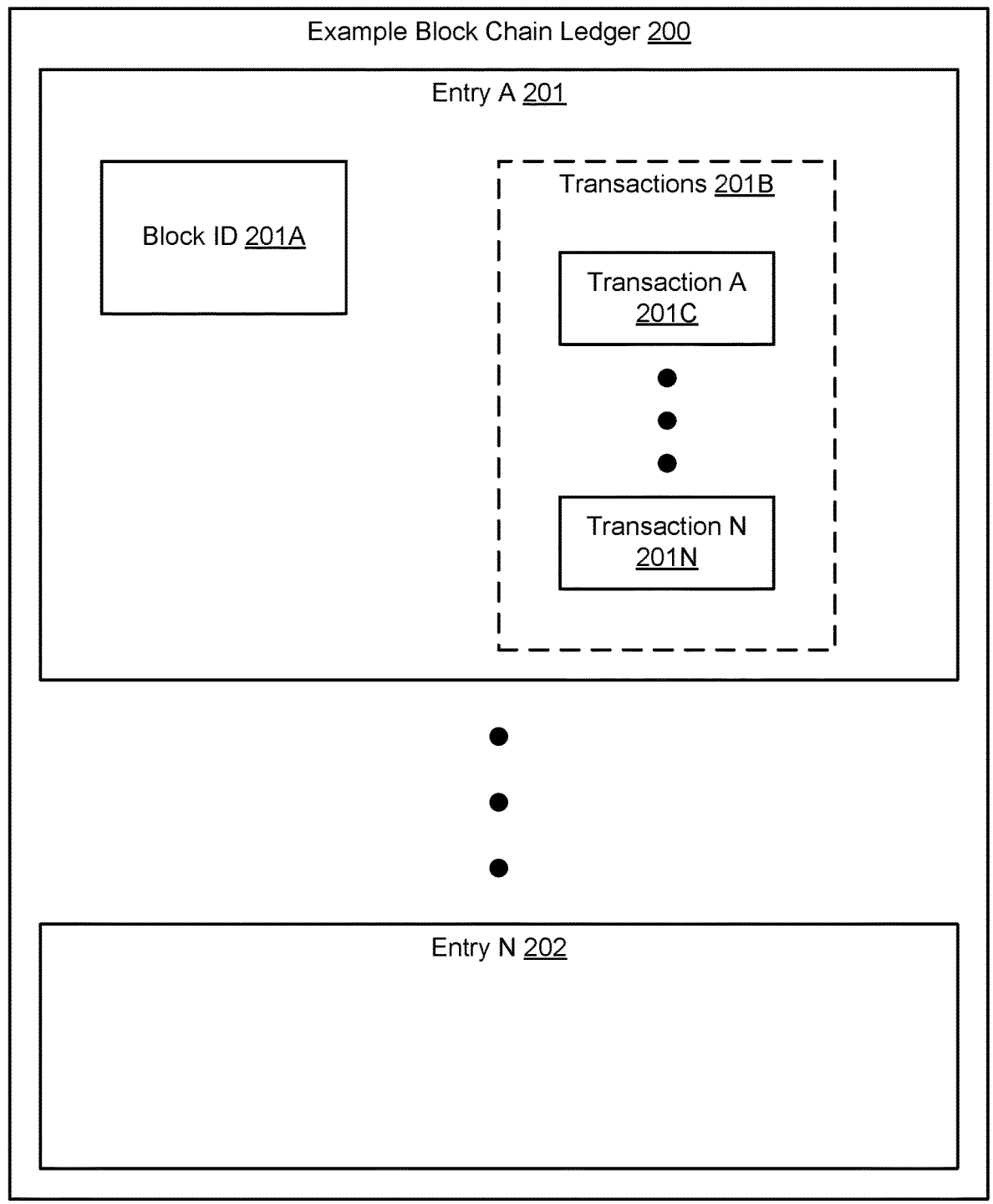
FIG. 2.1

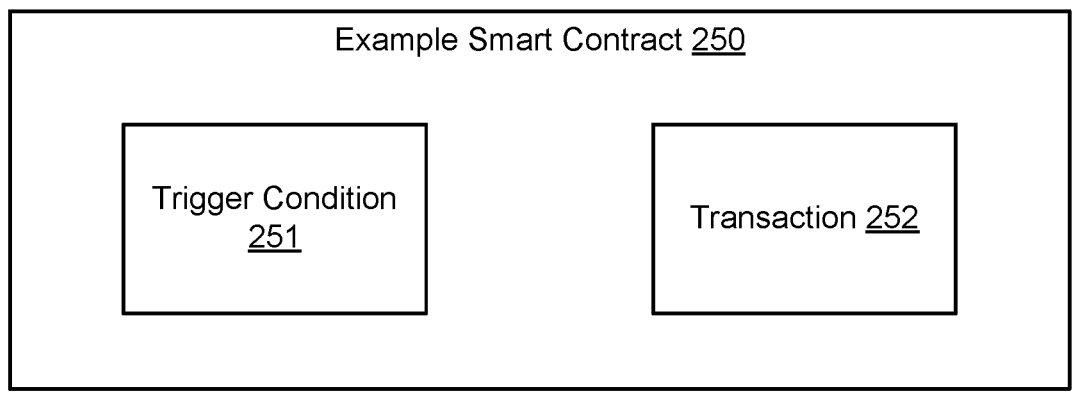
FIG. 2.2

SYSTEM AND METHOD FOR DISTRIBUTED, SECURE COMPUTING SYSTEM

CROSS REFERENCE AND INCORPORATION BY REFERENCE

This U.S. Utility Application claims the benefit of U.S. Provisional Application No. 62/620,362 filed on Jan. 22, 2018, and U.S. Provisional Application No. 62/628,719 filed on Feb. 9, 2018, the contents of both of which are incorporated by reference in its entirety.

BACKGROUND

Computing devices may store information. Multiple computing devices may share information between the computing devices. When information is shared between computing devices, any particular computing device may not be able to ascertain how information from another computing device was obtained by the other computing devices. In such a scenario, a user of the computing device may doubt the accuracy of the data from the other computing device.

SUMMARY

In one aspect, a method for injecting data into a secure distributed computing system in accordance with embodiments of the invention includes obtaining characteristics of an object via a secure operable connection from a smart silo; verifying an identity of the smart silo based on credentials included in a message from the smart silo received via the secure operable connection; making a determination that the characteristics match a trigger condition of a smart contract; and executing the smart contract in response to the determination.

In one aspect, a system in accordance with one or more embodiments of the invention includes a distributed computing system that includes persistent storage. The persistent storage stores a block chain ledger and smart contract requirements of a smart contract. The system further includes an object purchaser, an object supplier, and a smart silo. The distributed computing system is programmed to execute a distributed data structure manager that obtains characteristics of an object via a secure operable connection from the smart silo, verifies an identity of the smart silo based on credentials included in a message from the smart silo received via the secure operable connection, makes a determination that the characteristics match a trigger condition of the smart contract requirements; and executes the smart contract in response to the determination.

In one aspect, a non-transitory computer readable medium in accordance with one or more embodiments of the invention includes computer readable program code, which when executed by a computer processor enables the computer processor to perform a method for injecting data into a secure distributed computing system, the method includes obtaining characteristics of an object via a secure operable connection from a smart silo; verifying an identity of the smart silo based on credentials included in a message from the smart silo received via the secure operable connection; making a determination that the characteristics match a trigger condition of a smart contract; and executing the smart contract in response to the determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a distributed computing device in accordance with one or more embodiments of the invention.

FIG. 1.3 shows a diagram of a smart silo in accordance with one or more embodiments of the invention.

FIG. 2.1 shows a diagram of a block chain ledger in accordance with one or more embodiments of the invention.

FIG. 2.2 shows a diagram of a smart contract in accordance with one or more embodiments of the invention.

DETAILED DESCRIPTION

Figure 3:
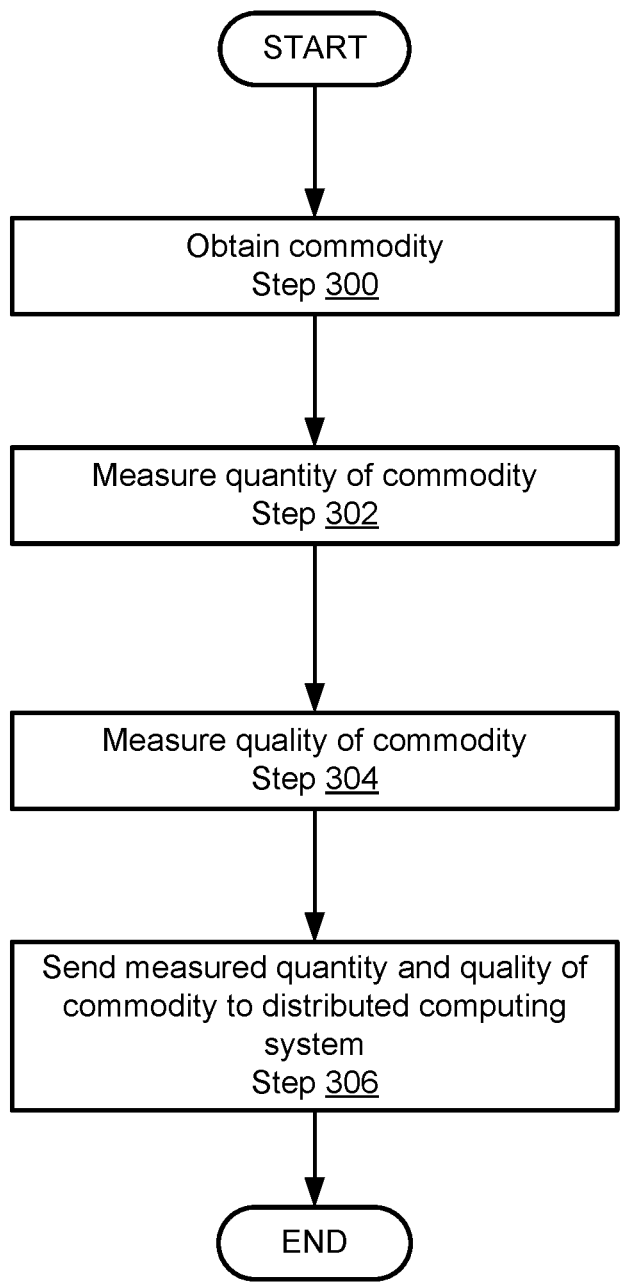
FIG. 3 shows a flowchart of a method of operating a smart silo in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for integrating data into a distributed computing system. A system in accordance with embodiments of the invention may include a data integrator. The data integrator may be a physical device that obtains information and securely injects the obtained information into the distributed computing system.

For example, the data integrator may be a computing device that includes sensors. The sensors may be used to determine characteristics of physical objects. The characteristics of the physical objects may be injected into the distributed computing system in a manner that enables nodes of the distributed computing system to rely on the accuracy of the characteristics of the object. To securely inject the obtained information into the distributed computing system, the data integrator may be operably connected to the distributed system by one or more secure operable connections.

The distributed computing system may enable users of the distributed computing system to take action based on information obtained by data integrators by securing a trust envelope that includes the data integrators and the distributed computing system. By doing so, the users of the distributed computing system may rely on the accuracy of information obtained by the data integrators when taking action.

In one or more embodiments of the invention, the distributed computing system provides mechanisms for automating actions of the users. For example, the distributed computing system may include smart contracts. The smart contracts may be applications that automatically take action when information obtained by a data integrator matches trigger conditions specified by the data integrators. In one or more embodiments of the invention, the trigger conditions specified by the data integrators are based on characteristics of objects that are determined using the sensors of the data integrators.

In one or more embodiments of the invention, the system facilitates the exchange of commodities. One or more embodiments of the invention may provide a system for exchanging goods that ensures the prompt payment as part of the exchange of the commodities. For example, smart contracts in accordance with one or more embodiments of the invention automatically transfer consideration specified by a smart contract when a commodity supplier provides goods, i.e., commodities, to a data integrator meeting one or more requirements specified by the smart contract. The goods may by other types of objects, other than commodities, without departing from the invention.

FIG. 1.1 shows an example of a system in accordance with one or more embodiments of the invention. The system illustrated in FIG. 1.1 may enable information regarding characteristics of objects or other real world objects to be securely injected into a distributed computing system used by users. For example, a first group of users, such as commodity suppliers (130), may have goods, such as commodities, that they wish to transfer to a second group of users, such as commodity purchasers (110), in exchange for consideration. To do so, information regarding characteristics of the goods needs to be made available to users of the system.

The system may include a distributed computing system (100). The distributed computing system may facilitate distribution of information obtained from data integrators to users of the distributed system. For example, the system may include smart silos (120), e.g., data integrators that characterize goods obtained from the commodity suppliers (130). The smart silos (120) may securely provide such information to the distributed computing system (100). Based on the information obtained from the smart silos (120), predetermined actions of users of the distributed computing system (100) may be automatically performed by the distributed computing system (100). In this manner, one or more embodiments of the invention may provide a system, secured by an envelope of trust, which enables users of the system to rely on information within the distributed computing system (100). By doing so, a system in accordance with one or more embodiments of the invention may securely, automatically, and/or verifiably facilitate a transaction between users of the system.

Each component of the system of FIG. 1.1 may be operably connected to other components of the system and/or other physical devices via any combination of wired and/or wireless networks. The system may include any number of commodity purchasers (110), smart silos (120), and commodity suppliers (130). Components of the system of FIG. 1.1 are discussed below.

In one or more embodiments of the invention, the smart silos (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The smart silos (120) may be other types of computing devices without departing from the invention. For additional details regarding computing devices, refer to FIG. 6.

In one or more embodiments of the invention, the smart silos (120) are distributed computing devices. A distributed computing device may refer to functionality provided by a logical device that utilizes the computing resources of one or more separate and/or distinct computing devices. For example, in one or more embodiments of the invention, the smart silos (120) may be distributed devices that include components distributed across any number of separate and/or distinct computing devices. In such a scenario, the functionality of the smart silos (120) may be performed by multiple different computing devices without departing from the invention.

In one or more embodiments of the invention, the smart silos (120) provide characterization services. The characterizations services may include: (i) obtaining information regarding objects provided by commodity suppliers (130) and (ii) securely injecting the obtained information into the distributed computing system (100). To provide the aforementioned functionality, the commodity suppliers (130) may perform all or a portion of the methods illustrated in FIGS. 3-4. For additional details regarding smart silos, refer to FIG. 1.3.

In one or more embodiments of the invention, the distributed computing system (100) is a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The smart silos (120) may be other types of computing devices without departing from the invention. For additional details regarding computing devices, refer to FIG. 6.

In one or more embodiments of the invention, distributed computing system (100) is a distributed computing device. A distributed computing device may refer to functionality provided by a logical device that utilizes the computing resources of one or more separate and/or distinct computing devices. For example, in one or more embodiments of the invention, the distributed computing system (100) may be distributed devices that include components distributed across any number of separate and/or distinct computing devices. In such a scenario, the functionality of the distributed computing system (100) may be performed by multiple different computing devices without departing from the invention.

In one or more embodiments of the invention, the distributed computing system (100) provides data distribution and/or data processing services to the commodity purchasers (110), the smart silos (120), and/or the commodity suppliers (130). The distributed computing system (100) may provide data distribution services by (i) securely obtaining data from smart silos and (ii) replicating copies of the obtained data to any number of computing devices via a trusted distribution algorithm. The distributed computing system (100) may provide data processing services by (i) automatically performing actions in response to predetermined data being obtained from the smart silos and (ii) enforcing rules on data stored in the distributed computing system (100) to extend a trust envelope to include each computing device of the distributed computing system and the smart silos. To extend the trust envelope, the distributed computing system may support a block chain ledger. A block chain ledger may be a secured data structure that enables users of the distributed computing system to rely on the accuracy of data included in the block chain ledger. For additional details regarding the block chain ledger, refer to FIG. 2.1.

In one or more embodiments of the invention, the distributed computing system may facilitate the transfer of rights to commodities by automatically transferring payment for the commodities in response to a determination that the supplied commodities meet a required quantity and/or quality.

In one or more embodiments of the invention, the transfer is facilitated by the exchange of a cryptographically secure currency in consideration for the transfer of the commodities. In such a scenario, a commodity purchaser may put a quantity of currency into escrow and may be issued a quantity of the cryptographically secure currency. In such a scenario, the cryptographically secure currency may be redeemed for the currency in escrow.

In other embodiments of the invention, an escrow system is used to perform the transfer. In such a scenario, the currency in escrow may be directly transferred to a supplier when a delivery of goods conforming to the requirements of a smart contract is supplied to a commodity purchaser.

Figure 4:
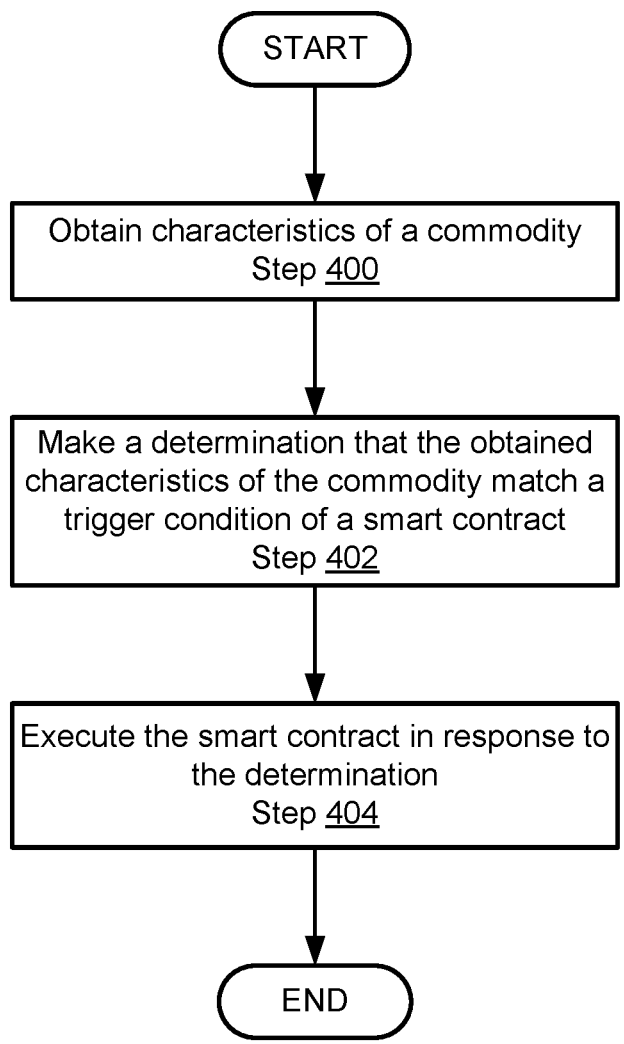
FIG. 4 shows a flowchart of a method of operating a distributed computing system in accordance with one or more embodiments of the invention.

To provide the aforementioned functionality, the distributed computing system (100) may perform all or a portion of the methods illustrated in FIGS. 3-4. For additional details regarding distributed computing systems, refer to FIG. 1.2.

The commodity suppliers (130) may be individuals that provide objects to the smart silos (120) for characterization purposes. For example, the commodity suppliers (130) may obtain commodities and provide the obtained commodities to the smart silos (120). By doing so, information regarding the commodities may be securely injected into the distributed computing system (100).

Additionally, the commodity suppliers (130) may obtain smart contract services from the distributed computing system (100). For example, when the commodity suppliers (130) provide objects for characterization, the information regarding the objects injected into the distributed computing system (100) may trigger execution of a smart contract. In such a scenario, execution of the smart contract may facilitate completion of a transaction between a commodity suppliers and a commodity purchaser. For additional details regarding smart contract, refer to FIG. 2.2.

While, for the sake of brevity, FIG. 1.1 has been illustrated as including a limited number of components, a system in accordance with embodiments of the invention may include additional, fewer, and/or different components without departing from the invention.

To further clarify aspects of embodiments of the invention, FIGS. 1.2 and 1.3 show diagrams of distributed computing systems and smart silos, respectively. The smart silo may communicate with the distributed computing system via an application programming interface (API). To communicate via the API, the smart silo may go through a certification process. In one or more embodiments, a REST API may be available on HTTP SSL channels for API security best practices and data is presented as a JSON.

As noted above, FIG. 1.2 shows a diagram of a distributed computing system in accordance with embodiments of the invention. A distributed computing system may refer to multiple computing devices that are orchestrated to accomplish a goal. For example, a distributed computing system in accordance with embodiments of the invention may include ten computing devices located at different geographic locations. Each of the computing devices may be operably connected to each other. For example, each of the computing devices may be operably connected to the Internet. A distributed computing system may include any number of computing devices without departing from the scope of the invention.

To orchestrate the computing devices of the distributed computing system (100), each of the computing devices may be executing a process, i.e., an instance of an application, which provides the functionality of the distributed computing system (100). The computing devices may be executing any number of processes to provide the aforementioned functionality without departing from the invention. For example, in some embodiments of the invention the process may support threading for parallel execution via any number of processing units. For additional details regarding a computing device, refer to FIG. 6.

As noted above, the distributed computing system may facilitate data distribution and processing within a trust envelope. A trust envelope may refer to a number of different entities that include functionality to enforce rules regarding data within the trust envelope. By doing so, users of entities within the trust envelope may rely on the accuracy of the data within the trust envelope. To provide the aforementioned functionality, the distributed computing system (100) may include a distributed data structure manager (101) and persistent storage (105). Each of these components of the distributed computing system (100) is discussed below.

In one or more embodiments of the invention, the distributed data structure manager (101) is an application, i.e., one or more processes executing using computing resources of the distributed computing system, that: (i) maintains a block chain ledger (106), smart contract(s) (102), and smart contract requirements (108). The computer readable instructions, i.e., computer code, for the distributed data structure manager (101) may be stored on persistent storage of the distributed computing system (100). In one or more embodiments of the invention, the computer code may be stored on each computing device of the distributed computing system (100) and each computing device of the distributed computing system may be executing a process that utilizes the computer code, i.e., an instance.

In one or more embodiments of the invention, the distributed data structure manager (101) is a hardware device including circuitry. The distributed data structure manager (101) may be, for example, a digital signal processor, a field programmable gate array, or an application specific integrated circuit. The distributed data structure manager (101) may be other types of hardware devices without departing from the invention.

In one or more embodiments of the invention, the smart contract(s) (102) are applications executing using computing resources of the distributed computing system. Each of the smart contract(s) (102) may automatically append a transaction to the block chain ledger (106) when a condition specified by the smart contract(s) (102) occurs.

For example, a smart contract may have a condition that specifies that when a predefined quantity of a commodity meeting a predefined quality level is obtained and verified by a data integrator, such as a smart silo, ownership of the commodity will be transferred to a commodity purchaser and a transaction will be appended to the block chain ledger (106) for a predetermined quality of the cryptographically secure currency.

In another example, a smart contract may have a condition that specifies that when a predefined quantity of a commodity meeting a predefined quality level is obtained and verified by a data integrator such as a smart silo, ownership of the commodity will be transferred to a commodity purchase and a transaction will be appended to the block chain ledger (106) for a predetermined quantity of currency. The computer readable instructions, i.e., computer code, for the smart contract(s) (102) may be stored on persistent storage of the distributed computing system (100). In one or more embodiments of the invention, the computer code may be stored on each computing device of the distributed computing system and each computing device of the distributed computing system may be executing a process that utilizes the computer code, i.e., an instance.

In one or more embodiments of the invention, the commodity purchasers (110) may invoke the smart contract(s) (102) to purchase commodities. Invoking a smart contract may mean to bring the smart contract into existence. For example, commodity purchasers may invoke a smart contract by sending a request for such a smart contract to be instantiated to the distributed computing system (100) executing distributed data structure manager (101). The smart contract(s) (102) may enable commodity suppliers to be notified of the desire for the commodity purchasers to purchase commodities. For example, the smart contract(s) (102) may be publicly available/viewable via information included in the block chain ledger (106).

In one or more embodiments of the invention, the smart contract(s) (102) are defined on a granular level so that the delivery of a portions of a desired quantity of a commodity specified by the smart contract results in a partial payment. For example, the smart contract(s) (102) may specify a total quantity of commodity desired and specify incremental payments, i.e., appending transaction to the block chain ledger (106) for portions of the total desired quantity a commodity, for portions of a commodity meeting quality requirements of the smart contract. In such a scenario, when an incremental payment is appended to the block chain ledger (106), the total desired quantity of the commodity specified by the smart contract(s) (102) may decrease. For additional details regarding partial payment, refer to the example illustrated in FIG. 2.2.

In one or more embodiments of the invention, the smart contract(s) (102) are invoked and voided, i.e., executing process terminated, at any point in time.

While the smart contract(s) (102) have been described as executing processes, embodiments of the invention are not limited to that specific implementation. For example, the smart contract(s) (102) may be implemented as states in a state machine, or other data structure associated with representation entities. For example, each of the smart contract(s) (102) may be represented by the current state of a state machine.

In one or more embodiments of the invention, the persistent storage (105) is a storage device that stores data structures. The persistent storage (105) may be a physical or logical device. For example, the persistent storage (105) may include solid state drives, solid state drives, tape drives, and other components to provide data storage functionality. Alternatively, the persistent storage (105) may be a logical device that utilizes the physical computing resources of other components to provide data storage functionality.

In one or more embodiments of the invention, the persistent storage (105) stores a block chain ledger (106) and smart contract requirements (108). Each of these data structures is discussed below.

In one or more embodiments of the invention, the block chain ledger (106) is a data structure stored using storage resources of the distributed computing system (100). The block chain ledger (106) may include an accounting of the transactions facilitated by the system. The block chain ledger (106) may include entries for each of the commodity purchasers and each of the commodity suppliers, in addition to entries associated with other entities. The entries may include a listing of all the transactions between each of the commodity purchasers and each of the commodity suppliers.

For example, the entry may specify all of the transactions that the associated entry has performed. While the block chain ledger (106) has been described as including entries, the block chain ledger (106) may be of any format, may be subdivided into any number of data structures, and/or may include additional, different, or less information than discussed here without departing from the invention. For additional details regarding the block chain ledger, refer to FIG. 2.1.

In one or more embodiments of the invention, the smart contract requirements (108) is a data structure stored using storage resources of the distributed computing system (100). The smart contract requirements (108) may include information regarding the requirements of the smart contract(s) (102). For example, the smart contract requirements (108) may specify the characteristics and quantities of goods necessary for an action specified by the smart contract to be performed, such as an automatic transfer of rights to the goods and consideration, i.e., payment, for the rights to the goods. For additional details regarding smart contracts, refer to FIG. 2.2.

As noted above, a smart silo may be a data integrator that provides data to the distributed computing system. FIG. 1.3 shows a diagram of a smart silo (121) in accordance with one or more embodiments of the inventions. The system of FIG. 1.1 may include any number of smart silos without departing from the invention.

In one or more embodiments of the invention, the smart silo (121) is a physical device that: measures (i) a quantity of a commodity and (ii) a quality of the measured commodity. The smart silo (121) may also store the measured commodity in a bay, hanger, or other structure.

In response to obtaining the quantity and/or quality of a commodity, the smart silo (121) may send a certificate to a distributed computing system executing a distributed data structure manager and thereby notify smart contract(s) of information regarding the commodities.

In one or more embodiments of the invention, the smart silo (121) includes a representational database for storing the certificates and/or data on which the certificates are based. In one or more embodiments of the invention, data in the relational database may be graphically illustrated via a graphical user interface displayed on a display.

To provide the above noted functionality, the smart silo (121) may include a characterization manager (122), sensors (123), a data injector (124), and a persistent storage (125). Each of these components of the smart silo (121) is discussed below.

The characterization manager (122) may perform characterizations of objects such as, for example, commodities. The commodities may be of any types without departing from the invention. The characterization manager (122) may obtain information regarding the objects using the sensors (123), store such information in a characteristics repository (126), and inject the information into a distributed computing system using the data injector (124). The characterization manager (122) may perform all or a portion of the method illustrated in FIG. 3.

In one or more embodiments of the invention, the characterization manager (122) is a hardware device including circuitry. The characterization manager (122) may be, for example, a digital signal processor, a field programmable gate array, or an application specific integrated circuit. The characterization manager (122) may be other types of hardware devices without departing from the invention.

In one or more embodiments of the invention, the characterization manager (122) is implemented as computing code stored on a persistent storage that when executed by a processor performs the functionality of the characterization manager (122). The processor may be a hardware processor including circuitry such as, for example, a central processing unit or a microcontroller. The processor may be other types of hardware devices for processing digital information without departing from the invention.

The sensors (123) may be physical devices for obtaining information regarding objects provided by commodity suppliers or other entities. The sensors (123) may include, but are not limited to, scales, thermometers, vapor pressure sensors, and image sensors. Such sensors (123) may be used to determine a quantity and quality of objects. In one or more embodiments of the invention, sensors (123) include a scale for measuring a weight of an object and a hygrometer for measuring a quantity of water within the object. The sensors (123) may provide multidimensional information regarding an object. That is, the sensors (123) may characterize any number of physical properties of the object without departing from the invention.

The sensors (123) may be controlled by the characterization manager (122). For example, the sensors (123) operably connected to the characterization manager (122) via RS-232 connections. The sensors may be operably connected to the computing device using other interfaces without departing from the invention. The characterization manager (122) may send commands to the sensors (123) via the operable connection and may receive measurements from the sensors (123) via the operable connection.

The data injector (124) may securely inject data obtained by the characterization manager (122) into a distributed computing system. To do so, the data injector (124) may establish an encrypted operable connection with the distributed computing system. For example, the data injector (124) may identify itself to a distributed computing system to which it desires to inject data prior to injection. The distributed computing system may reject any attempts to inject that for which the distributed computing system is unable to identify the identity of the injector. The data injector (124) may send security credentials or another identifier to identify itself to the distributed computing system.

After identifying itself, the data injector (124) may send information regarding objects via the encrypted operable connection when instructed to do so by the characterization manager.

In one or more embodiments of the invention, the data injector (124) is a hardware device including circuitry. The data injector (124) may be, for example, a digital signal processor, a field programmable gate array, or an application specific integrated circuit. The data injector (124) may be other types of hardware devices without departing from the invention.

In one or more embodiments of the invention, the characterization manager (122) is implemented as computing code stored on a persistent storage that when executed by a processor performs the functionality of the characterization manager (122). The processor may be a hardware processor including circuitry such as, for example, a central processing unit or a microcontroller. The processor may be other types of hardware devices for processing digital information without departing from the invention.

In one or more embodiments of the invention, the persistent storage (125) is a storage device that stores data structures. The persistent storage (125) may be a physical or logical device. For example, the persistent storage (125) may include solid state drives, solid state drives, tape drives, and other components to provide data storage functionality. Alternatively, the persistent storage (125) may be a logical device that utilizes the physical computing resources of other components to provide data storage functionality.

In one or more embodiments of the invention, the persistent storage (125) stores a characteristics repository (126). The characteristics repository (126) may be a data structure that include information regarding the characteristics, e.g., quantity, quality, etc., of objects. The data structure may be populated by the characterization manager.

To further clarify aspects of embodiments of the invention, FIG. 2.1 show diagrams of a data structure that may be utilized by the system of FIG. 1.1 in accordance with embodiments of the invention.

FIG. 2.1 shows an example of a block chain ledger (200) in accordance with one or more embodiments of the invention. The example block chain ledger (200) includes any number of entries (201, 202). Periodically, new entries may be added to the example block chain ledger (200). The entries (201, 202) may be ordered, otherwise arranged, and/or have associations that indicate a temporal ordering of entries. As will be discussed below, each entry may include a number of transactions. Thus, the ordering of the entries may specify an ordering of the transactions relative to one another rather than a specific point in time at which the transaction occurred.

Each of the entries (201, 202) may include a block identifier (e.g., 201A) and a number of transactions (e.g., 201B). The block identifier (201A) may be a unique identifier such as, for example, a uniform resource identifier that enables the entry that includes the block identifier (201A) to be distinguished from all other entries.

The transactions (201B) may be descriptions of individual transactions (201C, 201N) between various entities such as commodity suppliers and consumers. Each of the individual transactions (201C, 201N) may specify a quantity of currency and/or cryptographic currency that was transferred between the entities as part of the transaction. The transactions (201B) may include any number of transactions without departing from the invention. Thus, in one or more embodiments of the invention, the transactions (201B) may specify changes to the amount of currency and/or cryptographic currency owned by an entity. The total amount of currency and/or cryptographic currency owned by an entity may be determined by summing all of the transactions in all of the entries in the example block chain ledger (200).

To further clarify the process of a partial payment with respect to smart contracts, FIG. 2.2 shows an example scenario in which an example smart contract (250) has been generated. The example smart contract includes a trigger condition (251) that specifies that delivery of 500 lbs of corn results in the appending of a transaction (252) of $1000 to the entity that delivers the 500 lbs of corn. The trigger condition (251) also specifies that that partial deliveries and proportionate payment are enabled for the example smart contract. In other words, the trigger condition (251) of the example smart contract (250) will be met whenever a partial delivery of the 500 lbs of corn is completed and will result in the appending of a transaction specifying a proportional amount of the $1000 to the entity that supplied the corn. Lastly, the trigger condition (251) further specifies that, upon receipt of 500 lbs of corn, the example smart contract (250) is terminated.

At a first point in a time, a supplier delivered 100 lbs of corn. In response to the delivery, the example smart contract (250) is triggered and appends a first transaction to the block chain ledger that specifies $200 to the supplier.

At a second point in a time, a supplier delivered 200 lbs of corn. In response to the second delivery, the example smart contract (250) is triggered and appends a transaction to the block chain ledger that specifies $400 to the supplier.

At a third point in a time, a supplier delivered 200 lbs of corn. In response to the delivery, the example smart contract (250) is triggered and appends a transaction to the block chain ledger that specifies $400 to the supplier.

After appending the third transaction, the trigger condition (251) is met and the example smart contract (250) is terminated because 500 lbs of corn has been delivered.

While the example of FIG. 2.2 includes only a single example smart contract (250), the system of FIG. 1.1 may include any number of smart contract(s) (102, FIG. 1.2) that may be executing at any point in time without departing from the invention. Additionally, any number of smart contract(s) (102, FIG. 1.2) may be invoked by a commodity purchaser without departing from the invention. For example, a first commodity purchaser may invoke one hundred smart contracts while a second commodity purchaser (not shown) may invoke ten smart contracts.

In one or more embodiments of the invention, the smart contract(s) (102, FIG. 1.2) are implemented as instructions stored on a non-transitory computer readable being executed by a processor of the distributed computing system. The instructions may cause the distributed computing system to perform the functionality of the smart contracts and/or the method illustrated in FIGS. 3-4.

As discussed above, components of the system of FIG. 1.1 may perform methods for facilitating transactions. FIGS. 3-4 show methods in accordance with one or more embodiments of the invention that may be performed by components of the system of FIG. 1.1. Any of the steps shown in FIGS. 3-4 may be omitted, performed in a different order, and/or performed in parallel or partially overlapping manner with respect to other steps without departing from the invention.

FIG. 3 shows a flowchart of a method in accordance with one or more embodiments of the invention. The method depicted in FIG. 3 may be used to perform a portion of a transaction in accordance with one or more embodiments of the invention. The method shown in FIG. 3 may be performed by, for example, a smart silo (e.g., 121, FIG. 1.1). Other components of the system illustrated in FIG. 1.1 may perform all or a portion of the method of FIG. 3 without departing from the invention.

In Step 300, a commodity is obtained. The commodity may be, for example, corn, wheat, soybeans, apples, bananas, pigs, cows, or any other type of commodity.

In one or more embodiments of the invention, the commodity is obtained by receiving the commodity from a commodity supplier. For example, the commodity supplier may drive a truck including the commodity to the smart silo or another facility capable of characterizing a quantity/quality or other characteristic of the commodity. The commodity may then be loaded in to into the smart silo.

In Step 302, the quantity of the commodity is measured. As used herein, the quantity of the commodity refers to any objective metric regarding an amount of the commodity. The quantity may be, for example, a weight of the commodity, a volume of the commodity (e.g., number of containers the commodity filled), and/or a number of individual elements of the commodity (e.g., number of bananas). The quantity of the commodity may be other objective metrics without departing from the invention.

In one or more embodiments of the invention, the quantity of the commodity is measured using a sensor. The sensor may be, for example, a scale, a displacement sensor, or a count sensor. Other sensors may be used without departing from the invention.

In Step 304, the quality of the commodity is measured. As used herein, the quality of the commodity refers to a condition of the commodity. The condition may be, for example, a water content of the commodity, a relative age of the commodity, a color of the commodity, or any other objective measurement of the commodity. The quality of the commodity may be other types of conditions without departing from the invention.

In one or more embodiments of the invention, the quality of the commodity is measured using a sensor. The sensor may be, for example, a light sensor, a humidity sensor, or a chemical sensor. Other sensors may be used without departing from the invention.

In Step 306, the measured quantity and quality of the commodity is sent to the distributed computing system.

In one or more embodiments of the invention, the measured quantity and quality of the commodity are sent to the distributed computing system using a signed message that indicates the smart silo sent the signed message. The signed message may be signed using a private key or other cryptographic function enabling a receiver of the signed message to verify that the smart silo sent the signed message. Thus, by sending measured quantity and quality using a signed message, the distributed computing system can verify that the measured quantity and quality were sent from the smart silo. Accordingly, an envelope of trust between the smart silos and the distributed computing system is established.

The method may end following Step 306.

In one or more embodiments of the invention, the smart silo may also provide a ticket, certificate, or other document to the supplier of Step 300 that provided the commodity. The ticket, certificate, or other document may act as a receipt for the commodity.

FIG. 4 shows a flowchart of a method in accordance with one or more embodiments of the invention. The method depicted in FIG. 4 may be used to perform a portion of a transaction in accordance with one or more embodiments of the invention. The method shown in FIG. 4 may be performed by, for example, a distributed computing system (e.g., 100, FIG. 1.1). Other components of the system illustrated in FIG. 1.1 may perform all or a portion of the method of FIG. 4 without departing from the invention. One of ordinary skill will appreciate that some or all of these steps may be executed in different orders, may be combined or omitted, and some or all of the steps may be executed in parallel.

In Step 400, characteristics of a commodity are obtained.

In one or more embodiments of the invention, the characteristics of the commodity are a quantity and/or a quality of the commodity.

In one or more embodiments of the invention, the characteristics of the commodity are obtained from a smart silo or from a facility that is otherwise capable of determining characteristics of a commodity including but not limited to a quantity and/or quality of one or more commodities or other goods.

In one or more embodiments of the invention, the characteristics of the commodity are obtained from a message from a smart silo. In one or more embodiments of the invention, the message is a signed message that enables an identity of the sender to be identified.

In Step 402, a determination is made that the obtained characteristics of the commodity match a trigger condition of a smart contract.

In one or more embodiments of the invention, the determination may be made by comparing the trigger condition of the smart contract to the obtained characteristics of the commodity.

Prior to step 402, an identity of a provider of the characteristics of the commodity may be verified. For example, a secure connection may be used to communicate with a smart silo to obtain the characteristics of the commodity. Credentials of the smart silo may be used to verify an identity of the smart silo prior to the determination being made. If an identity of the smart silo cannot be ascertained, the obtained characteristics of the commodity may be discarded and step 400 may be repeated.

Additionally, the characteristics of the commodity may be distributed to at least 50% of the computing devices of a distributed system prior to step 402. For example, as the characteristics are distributed to copies of a block chain ledger, the determination may not be made. In this manner, consensus may be developed prior to the determination being made in Step 402.

In Step 404, the smart contract is executed in response to the determination. As used herein, executing a smart contract refers to the performance of an action by the smart contract.

In one or more embodiments of the invention, executing the smart contract includes appending a transaction to a block chain ledger. The transaction may include a credit to a supplier, i.e., a transfer of value to the supplier, which supplied the commodity and a debit to the entity that invoked the smart contract, i.e., a transfer of value away from the entity that invoked the smart contract.

In one or more embodiments of the invention, the credit and/or debit specify a quantity of currency held in an escrow account.

In one or more embodiments of the invention, the credit and/or debit specify a quantity of cryptographically secure currency.

In one or more embodiments of the invention, executing the smart contract further includes appending a transaction to a block chain ledger that indicates an owner of the commodity has changed to entity that invoked the smart contract. In other words, a transaction that indicates that to the person, company, or organization that desires to obtain the commodity is now the owner of the commodity.

In one or more embodiments of the invention, parties associated with the smart contract do not know an identity of the other party at the time the smart contract is executed. For example, a smart contract may be automatically executed when the determination of step 402 is made. The execution may be performed without need for an identity of a counter party to be ascertained by each party.

The method may end following Step 404.

Figure 5:
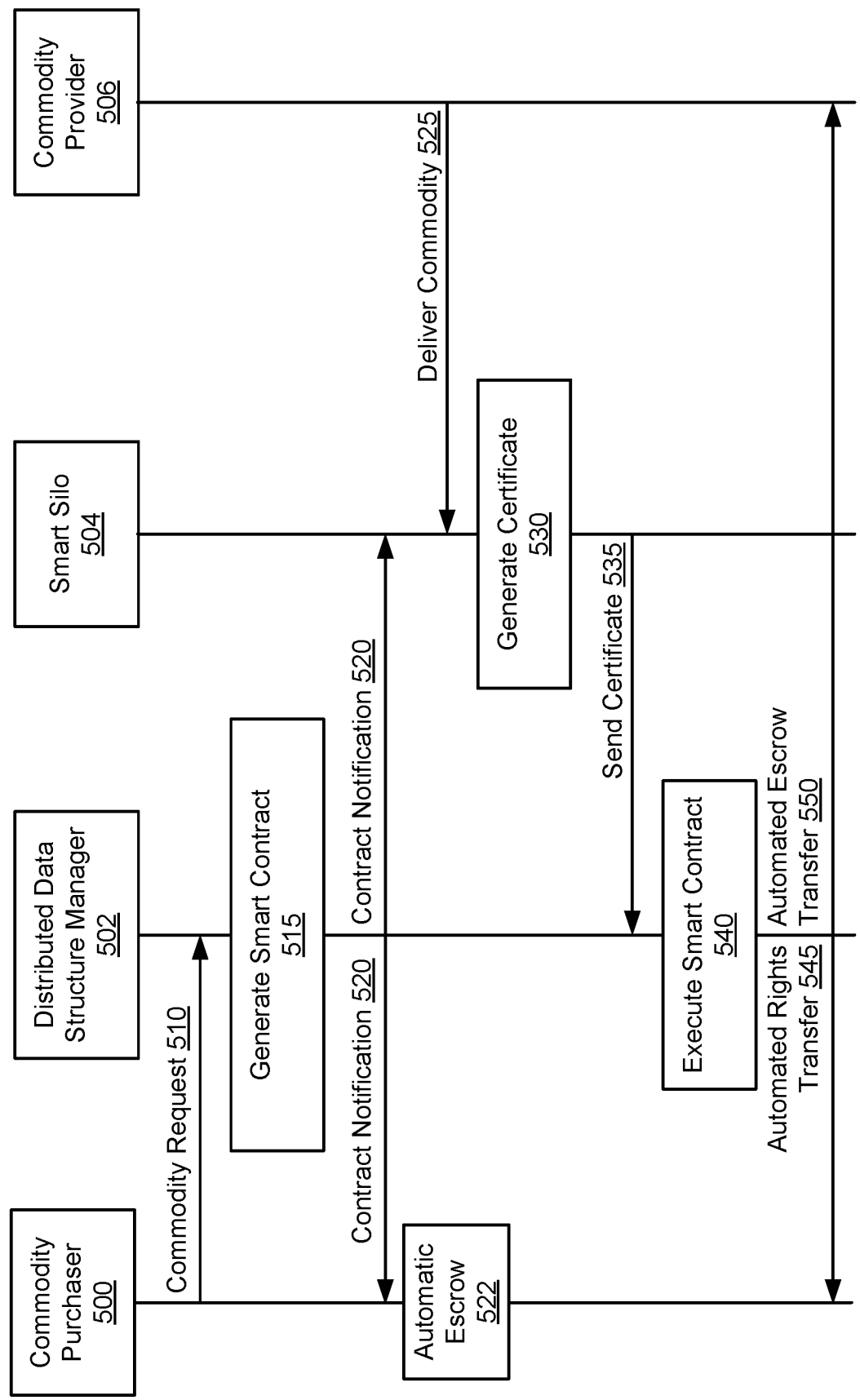
FIG. 5 shows a diagram of an example system over time.

To further clarify embodiments of the invention, a non-limiting example is provided in FIG. 5. FIG. 5 illustrates a system similar to that of FIG. 1.1. For the sake of brevity, only a limited number of components of the system of FIG. 1.1 are illustrated.

Example

To further clarify the operation of the system illustrated in FIG. 1.1, FIG. 5 shows a sequence diagram of interactions of an example system similar to that illustrated in FIG. 1.1. In the diagram, time progresses from top to bottom of the figure. In other words, interactions illustrated higher in the figure occur before interactions illustrated as being lower in the figure. Additionally, each of the vertical lines in the figure represents entities of the system. The arrows between vertical lines indicate interactions between components of the system. Each vertical line is annotated with the name of an entity associated with the vertical line in a box at the top of the diagram. Boxes below the identifiers of the vertical lines represent processes performed by the respective entity associated with each vertical line.

As seen from FIG. 5, the system includes a commodity purchaser (500), a distributed data structure manager (502) application executing in a distributed system, a smart silo (504), and a commodity provider (506).

In a first interaction, a commodity request (510) is sent to the distributed data structure manager (502) application. The commodity request (510) specifies a quantity and quality of a desired commodity.

In response to the first interaction, the distributed data structure manager (502) application generates a smart contract (515). The smart contract (515) indicates that if commodities meeting the quantity and quality of the desired commodity are provided, the commodity purchaser (500) will transfer a predetermined quantity of cryptographically secure currency to the provider. Once the smart contract is generated, notifications (520) may be sent to the commodity purchaser (500) and/or the smart silo (504). When the smart contract is generated, an automated escrow (522) may be performed that secures consideration specified in the smart contract from the commodity purchaser (500). The consideration may be the full contract amount or a partial delivery amount. For example, if the full contract amount is $500 for 100 pounds of corn, the automatic escrow may be for $500. In this example, a corresponding amount of cryptographically secure currency or other financial instrument may be secured from the commodity purchaser. Such security may be provided by the distributed data structure manager (502) or another entity such a third party escrow service. In another example, if the full contract amount is $500 for 100 pounds of corn with a partial delivery of 10 pounds of corn, the automatic escrow amount may be for $50. In this case, a 1:1 ratio between the partial payment amount and escrow amount is used, other ratios may be used without departing from the invention.

In a second interaction, the distributed data structure manager (502) application notifies a smart silo (504) of the smart contract (515), e.g., contract notification (520).

Based on the notification, a commodity provider (506) brings a quality of the commodity that the commodity provider (506) believes meets the requirements of the smart contract (515) to the smart silo (504). Once received, the smart silo (504) characterizes the quantity and quality of the received commodity. In this scenario, the characterization meets the requirements of the smart contract (515).

Once the commodity is characterized, the smart silo (504) generates a certificate that reflects the quality and quantity of the goods. The certificate may be a data structure that specifies the quality and quantity of the goods.

In a third interaction, the smart silo (504) sends the certificate to the distributed data structure manager (502) application. The certificate may be sent using a signed message than enables the distributed data structure manager (502) application to verify an identity of smart silo (504).

In response to receiving the certificate, the distributed data structure manager (502) application verifies that the certificate indicates that goods meeting the prescribed quantity and quality of the smart contract (515) have been received by the smart silo. In response to the verification, the smart contract (515) is executed.

By executing the smart contract (515), a transaction is appended to the ledger maintained by the distributed data structure manager (502) application indicating a reduction in the quantity of cryptographically secure currency associated with the commodity purchaser (500) and a corresponding increase in the quantity of cryptographically secure currency associated with the commodity provider (506). Additionally, execution of the smart contract (515) also transfers ownership of the commodity received by the smart silo (504) to the commodity purchaser (500).

For example, an ownership rights transfer (545) may be automatically performed to update the ownership of the commodity in the block chain ledger. Similarly, an automated escrow transfer (550) may be performed to update that the ownership status of the cryptographically secure currency in the block chain ledger.

By doing so, a secure transaction between two parties may be facilitated based on real world information integrated to a distributed system.

End of Example

Figure 6:
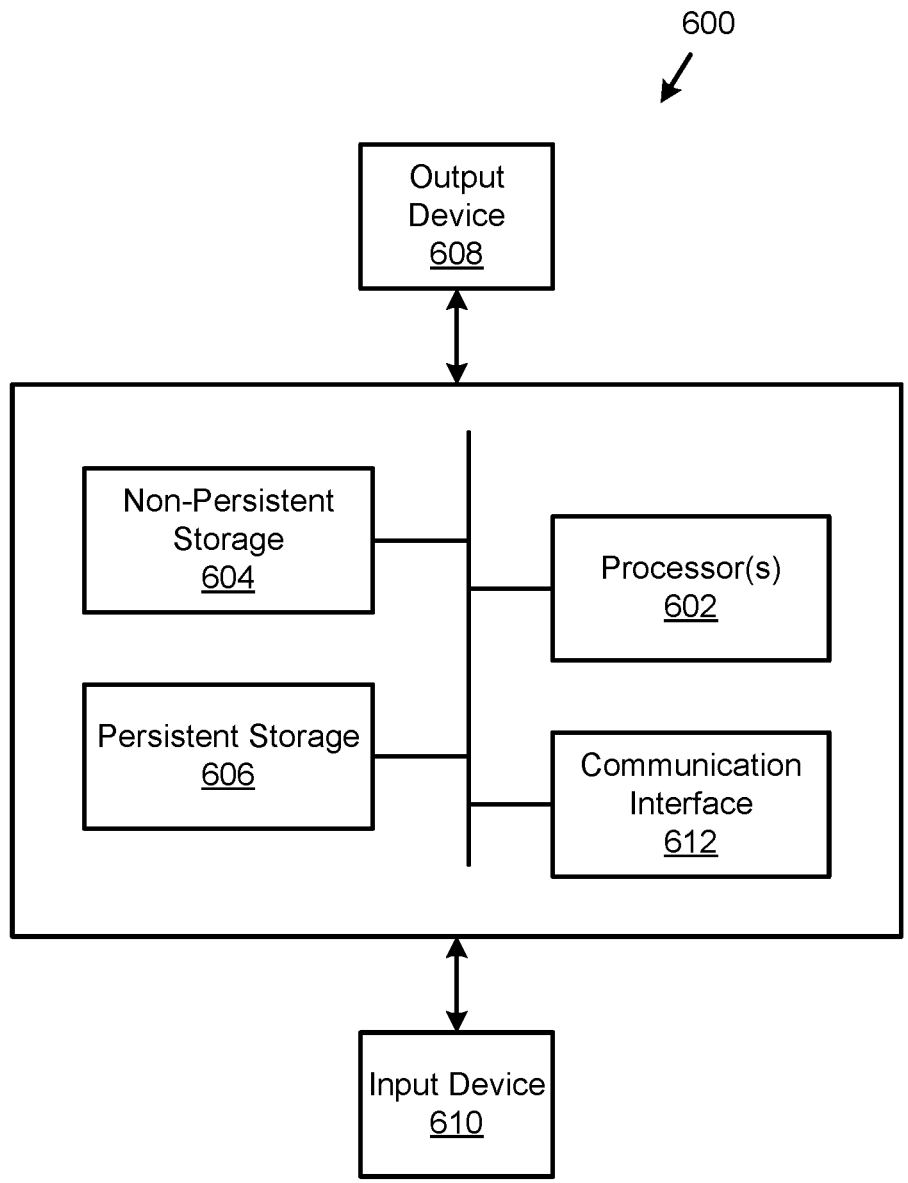
FIG. 6 shows a diagram of a computing device in accordance with one or more embodiments of the invention.

As discussed with respect to FIG. 1.1, embodiments of the invention may be implemented using computing devices. A diagram of an example computing device (600) in accordance with one or more embodiments of the invention is illustrated in FIG. 6.

The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

In one or more embodiments of the invention, a commodity is grain, food, and/or fiber. In one or more embodiments of the invention, the commodity is livestock or meat. In one or more embodiments of the invention, the commodity is an energy resource such as oil or natural gas. In one or more embodiments of the invention, the commodity is a metal. In one or more embodiments of the invention, the commodity is any other type of commodity.

In one or more embodiments of the invention, the grain, food, and/or fiber commodity is at least one commodity selected from a group of commodities consisting of corn, oats, rough rice, soybeans, rapeseed, soybean meal, soybean oil, wheat, milk, cocoa, coffee C, cotton No. 2, Sugar No. 11, sugar No. 14, frozen concentrated orange juice, and adzuki bean. The grain, food, and/or fiber commodity may be other types of grain, food, and/or fiber without departing from the invention.

In one or more embodiments of the invention, the livestock or meat commodity is at least one commodity selected from a group of commodities consisting of lean hogs, live cattle, and/or feeder cattle. The livestock or meat commodity may be other types of meat/livestock without departing from the invention.

In one or more embodiments of the invention, the energy resource commodity is at least one commodity selected from a group of commodities consisting of WTI crude oil, Brent crude, ethanol, natural gas, heating oil, gulf coast gasoline, reformulated gasoline blendstock for oxygen blending, propane, and purified terephthalic acid. The energy commodity may be other types of materials used to produce/generate/supply energy without departing from the invention.

In one or more embodiments of the invention, the metal commodity is at least one commodity selected from a group of commodities consisting of copper, lead, zinc, tin, aluminium, aluminium alloy, nickel, cobalt, molybdenum, recycled steel, gold, platinum, palladium, and silver. The metal commodity may be other types of metal without departing from the invention.

In one or more embodiments of the invention, the other commodity is at least one commodity selected from a group of commodities consisting of palm oil, rubber, wool, and amber.

In one or more embodiments of the invention, the other commodity is an oilfield commodity used in the production of hydrocarbon bearing materials. The oilfield commodity may be, for example, rock, sand, and/or proppant. As used herein, a proppant may be a material used in downhole operations in an oilfield. The proppant maybe, for example, a material injected into a wellbore to improve the extraction of hydrocarbon bearing fluid from the wellbore. The oilfield commodity may be other types of materials without departing from the invention.

While described above by way of specific example, a commodity in accordance with one or more embodiments of the invention may be any type of physical material that may be characterized to determine a quantity and/or quality of the physical material. Thus, one or more embodiments of the invention are not limited to the specific examples of commodities discussed above. For example, a smart silo may be any type of structure capable of characterizing a commodity and providing the characterization to market participants and/or smart contracts. Thus, embodiments of the invention are broadly applicable to commodity markets at large.

In one or more embodiments of the invention, a system provides a trust envelope that includes computing devices of a distributed system and a data integrator. The trust envelope may enable users of the system to take action based on data within the system. In other words, to trust the data within the system.

In one or more embodiments of the invention, the data integrator securely obtains real world data and securely injects the data into the distributed system. To securely obtain the real world data, the data integrator performs measurements on objects. The measurements may be performed using sensors. By performing the measurements to obtain the data, the accuracy of the data obtained by the data integrator may be trusted. For example, the sensors may generate signatures, or other types of data structures, that enable the accuracy of the data to be validated. The signatures and data may be provided to the distributed system. If any computing device of the distributed doubts the accuracy of the data, the validity of the data may be verified using the corresponding signature.

To securely inject the real world data, the data integrator may provide the data to the distributed system via a secured operable connection. For example, the data integrator may be operably connected to the distributed system via one or more encrypted connections.

Embodiments of the invention may improve the field of distributed computing by providing a mechanism for injecting data obtained from the real world into a distributed computing system in a secure manner. For example, a data integrator may characterize an object and securely transmit the characterization to the distributed computing system. The distributed computing system may ascertain the identity of the data integrator to validate the accuracy of the obtained data before allowing users of the distributed computing system to interact with the obtained data.

Additional embodiments of the invention may facilitate completion of transactions based on real world data. For example, embodiments of the invention may provide a system that automatically executes transactions based on securely obtained real world data. By doing so, both partners in a transaction may ensure that they are automatically provided consideration for the transaction.

Further embodiments of the invention may reduce a cognitive burden on a user of a distributed computing system. For example, embodiments of the invention may provide a distributed computing system that automatically validates the accuracy of data before the data is distributed to the users of the distributed computing system. By doing so, users of a distributed computing system in accordance with embodiments of the invention need not perform complex and computationally expensive data validation routines to rely on the accuracy of the data. Thus, embodiments of the invention may improve the field of distributed computing by eliminating the last mile problem of integrating data into such systems. By automatically securing data and integrating secured data into the distributed environment, a system in accordance with embodiments of the invention may be more user friendly, efficient, and cost effective than contemporary distributed computing system.

Still further embodiments of the invention may streamline completion of transactions in a globally distributed environment. For example, embodiments of the invention may enable commodity providers to provide commodity purchasers with commodities while both parties can be assured that the commodities meet predetermined requirements and commodity providers can receive payment for such commodities in a highly efficient and low cost manner. Similarly, commodity purchasers may rest assured that the commodities meet the requirements set forth in one or more smart contracts.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for receiving data and distributing the data into a secure distributed computing system, comprising:

receiving, at a node of a secure distributed computing system, data corresponding to characteristics of an object, the data received via a secure operable connection from a storage system configured to generate the data;

wherein the data comprises:

first data of a first characteristic of the object, the first data generated by a first sensor of the storage system and comprises a first signature generated by the first sensor, the first signature configured to enable accuracy of the first data to be validated; and second data of a second characteristic of the object, the second data generated by a second sensor of the storage system and comprises a second signature generated by the second sensor, the second signature configured to enable accuracy of the second data to be validated;

receiving, at the node from the storage system via the secure operable connection, a message including credentials, wherein the message comprises an encoded message that is encoded with a private key;

verifying, by the node, an identity of the storage system based on the received credentials;

after verifying the identity of the of the storage system, distributing, by the node, the data to each of multiple nodes of the secure distributed computing system based on verification of the identity of the storage system, wherein distributing the data to each of the multiple nodes comprises distributing the data to a set of nodes of a plurality of nodes of the secure distributed computing system such that each node of the set of nodes populates a corresponding data structure with the data based on the characteristics of the object, the populated data comprising immutable data;

after distributing the data to the set of nodes, determining, by the secure distributed computing system, whether the characteristics match a trigger condition of a smart contract; and in response to a determination that the characteristics match the trigger condition, executing, by the secure distributed computing system, the smart contract.

2. The method of claim 1, wherein:

executing the smart contract comprises initiating at least one action on a block chain ledger stored at the secure distributed computing system the block chain ledger comprises:
  a first entry corresponding to a first entity that invoked the smart contract; and
  a second entry corresponding to a second entity that provided the object to the storage system; and executing the smart contract comprises:
  appending a first transaction to a first entry of the block chain ledger, wherein the first transaction specifies a debit in a first amount associated with a first entity that invoked the smart contract;
  appending a second transaction to a second entry the block chain ledger, wherein the second transaction specified a credit in a second amount associated with a second entity that provided the object to the storage system; and
  initiating a transfer of the second amount from an escrow corresponding to the first entity to the second entity;

transferring ownership of the object to the first entity that invoked the smart contract;

determining whether requirements of the smart contract have been met; and based on a determination that the requirements of the smart contract have been met, terminating, by the secure distributed computing system, the smart contract.

3. The method of claim 1, wherein:

the secure distributed computing system comprises a plurality of nodes, each node of the plurality of nodes executing an instance of an application;

the message includes the data;

the data comprises an indicator of a quantity of the object and a quality of the object; and the characteristics of the object are determined by the storage system.

4. The method of claim 1, further comprising:

receiving, by the secure distributed computing system, a request from a first entity to invoke the smart contract;

generating, by the secure distributed computing system, the smart contract, wherein:
  generating the smart contract comprises establishing an escrow of an escrow amount based on the smart contract; and the smart contract comprises an application executable by a computing resource of the secure distributed computing system;

storing, by the secure distributed computing system, the smart contract at the secure distributed computing system; and transmitting, by the secure distributed computing system, a notification of the smart contract to the storage system, a second entity corresponding to a provider of the object, or both; and wherein making a determination that the characteristics of the object match the trigger condition of a smart contract comprises:
  identifying a quantity of the object using the characteristics of the object;
  identifying a quality of the object using the characteristics of the object;
  comparing the identified quantity of the object to a quantity, specified by smart contract requirements of the smart contract; and
  comparing the identified quality of the object to a quality specified by the smart contract requirements.

5. The method of claim 4, wherein:

an identified quantity of the object exceeds the quantity specified by the smart contract, an identified quality of the object exceeds the quality specified by the smart contract, or both;

the object comprises a physical object; and the storage system is configured to store the object.

6. The method of claim 1, further comprising:

prior to receiving the data corresponding to the characteristics of the object, establishing
  the secure operable connection between the secure distributed computing system and the storage system;

wherein:
  the message with credentials is received prior to the data;
  the data is encrypted with a private key of the storage system; and
  the object is a food stuff, livestock, fiber, timber, rock, sand, metal an energy resource, or proppant.

7. The method of claim 1, wherein:

the smart contract is executed while a first user or entity that invoked the smart contract is not aware of an identity of a second user or entity that supplied the object; or the smart contract is executed while the second user or entity is not aware of an identity of the first user or entity.

8. The method of claim 1, wherein:

the characteristics of the object were obtained using the first sensor and the second sensor;

the first characteristic of the object comprises a quantity of the object; and the second characteristic of the object comprises a quality of the object.

9. The method of claim 8, wherein:

the first sensor comprises a scale;

the second sensor comprises a hygrometer;

the quantity of the object that was obtained using the scale; and the quality of the object was obtained using the hygrometer.

10. The method of claim 1, wherein:

the set of nodes constitutes a majority of nodes of the secure distributed computing system; and determining whether the characteristics match the trigger condition of the smart contract occurs after each node of the majority of nodes has appended the characteristics of the object to a copy of a block chain ledger hosted by each respective node.

11. A non-transitory computer readable medium comprising instructions that, when executed by at least one computer processor of a secure distributed computing system, cause the at least one computer processor to perform operations comprising:
   receive first data corresponding to first characteristics of a first object via a first connection from a first storage system;
   wherein the first data comprises:
      first sub-data of a first characteristic of the first object, the first sub-data generated by a first sensor of the first storage system and comprises a first signature generated by the first sensor, the first signature configured to enable accuracy of the first sub-data to be validated; and
      second sub-data of a second characteristic of the first object, the second sub-data generated by a second sensor of the first storage system and comprises a second signature generated by the second sensor, the second signature configured to enable accuracy of the second sub-data to be validated;
   receive, from the first storage system via the first connection, a first message including first credentials, wherein the first message comprises an encoded message that is encoded with a private key;
   verify an identity of the first storage system based on the received first credentials;
   after verification of the identity of the of the first storage system based on the received first credentials, distribute the first data to each of multiple nodes of the secure distributed computing system based on the verified identity of the first storage system, wherein to distribute the first data to each of the multiple nodes comprises distributing the first data to a set of nodes of a plurality of nodes of the secure distributed computing system such that each node of the set of nodes populates a corresponding data structure with the first data based on the first characteristics of the first object, the populated first data comprising immutable data;
   after distribution the first data to the set of nodes, determine whether the first characteristics match a trigger condition of an application; and
   in response to a determination that the first characteristics match the trigger condition, execute the application, wherein execution of the application comprises initiation of at least one action on a block chain ledger stored at the secure distributed computing system.

12. The non-transitory computer readable medium of claim 11, wherein the instructions that, when executed by the computer processor, cause the at least one computer processor to perform the operations further comprising:
   receive second data corresponding to second characteristics of a second object via a second connection from a second storage system;
   receive, from the second storage system via the second connection, a second message including second credentials;
   determine whether an identity of the second storage system is verified based on the received second credentials; and
   based on a determination that the identity of the of the second storage system is unverifiable based on the received second credentials, discard the received second data.

13. The non-transitory computer readable medium of claim 11, wherein the instructions that, when executed by the computer processor, cause the at least one computer processor to perform the operations further comprising:
   receive third data corresponding to third characteristics of a third object via a third connection from a third storage system;
   receive, from the third storage system via the third connection, a third message including third credentials;
   verify an identity of the third storage system based on the received third credentials;
   after verification of the identity of the of the third storage system based on the received third credentials, distribute the third data to each of the multiple nodes of the secure distributed computing system based on the verified identity of the third storage system;
   determine whether the third characteristics match the trigger condition of the application; and
   in response to a determination that the third characteristics match the trigger condition, execute the application, wherein execution of the application comprises initiation of at least one action on the block chain ledger stored at the secure distributed computing system.

14. The non-transitory computer readable medium of claim 13, wherein:
   the first characteristics of the first object include a quantity that is less than a remaining quantity requirement corresponding to the application and greater than a partial quantity requirement corresponding to the application;
   the at least one action on a block chain ledger in response to the determination that the first characteristics match the trigger condition comprises an first action on the block chain ledger for the quantity corresponding to the application based on the first object; and
   the at least one action on a block chain ledger in response to the determination that the first characteristics match the trigger condition does not terminate the application.

15. The non-transitory computer readable medium of claim 13, wherein:
   the third characteristics of the third object include a quantity that is greater than or equal to a remaining quantity requirement corresponding to the application;
   the at least one action on a block chain ledger in response to the determination that the third characteristics match the trigger condition comprises an action on the block chain ledger for the quantity corresponding to the application based on the third object; and
   the at least one action on a block chain ledger in response to the determination that the characteristics match the trigger condition terminates the application.

16. A system comprising:
   a distributed computing system comprising persistent storage storing:
      a block chain ledger, and
      application requirements of an application;
   wherein the distributed computing system is programmed to execute a distributed data structure manager to perform operations comprising:
      establish a data communication connection with a storage system;

receive data corresponding to characteristics of an object via the data communication connection from the storage system;
wherein the data comprises:
first data of a first characteristic of the object, the first data generated by a first sensor of the storage system and comprises a first signature generated by the first sensor, the first signature configured to enable accuracy of the first data to be validated; and
second data of a second characteristic of the object, the second data generated by a second sensor of the storage system and comprises a second signature generated by the second sensor, the second signature configured to enable accuracy of the second data to be validated;
receive, from the storage system via the data communication connection, a message including credentials;
verify an identity of the storage system based on the received credentials;
after verification of the identity of the of the storage system based on the received credentials, populate a distributed data structure of the distributed computing system with the data based on the characteristics of the object, wherein to populate the distributed data structure, the data is distributed to one or more nodes;
after population of the distributed data structure based on the characteristics of the object such that the data is distributed to at least a predetermined amount of nodes of the distributed computing system, determine whether the characteristics match a trigger condition of the application; and
in response to a determination that the characteristics match the trigger condition, execute the application, wherein execution of the application comprises initiation of at least one action on the block chain ledger.

17. The system of claim 16, further comprising:
the storage system comprising:
the first sensor configured to:
measure a quantity of the object;
generate the first data based on the measured quantity of the object; and
generate the first signature configured to enable accuracy of the first data to be validated;
the second sensor configured to:
measure a quality of the object;
generate the second data based on the measured quality of the object; and
generate the second signature configured to enable accuracy of the second data to be validated; and
a computing device coupled to the first sensor and the second sensor;
wherein computing device of the storage system is programmed to perform operations comprising:
receive, from the distributed computing system, a notification corresponding to the application to the storage system;
provide a record to a supplier of the object;
receive, from the first sensor, the first data and the first signature;
receive, from the second sensor, the second data and the second signature;
generate a message including the first data, the first signature, the second data, the second signature, an identifier or certificate of the storage system, or a combination thereof;
sign the message using on a private key of the storage system;
access the distributed computing system via an application program interface (API) corresponding the distributed computing system; and
send the signed message to the distributed computing system via the API.

18. The system of claim 16, wherein:
the distributed computing system comprises a plurality of nodes, each node of the plurality of nodes configured to store a copy of the block chain ledger;
the block chain ledger comprises a plurality of entries, each entry of the plurality of entries comprising a block identifier and a number of transactions; and
the storage system comprises:
a storage location configured to store the object; and
one or more devices configured to measure the object and to communicate the data to the distributed computing system.

19. The system of claim 16, wherein:
the message comprises an encoded message that is encoded with a private key; and
the populated data comprises immutable data;
distributing the data to each of the one or more nodes comprises distributing the data to a set of nodes of a plurality of nodes of the distributed computing system such that each node of the set of nodes populates a corresponding data structure with the data based on the characteristics of the object, the populated data comprising immutable data; and
the set of nodes constitutes a majority of nodes of the distributed computing system.

20. The method of claim 1, further comprising, by the secure distributed computing system:
validating, based on the first signature, the accuracy of the first data; and
validating, based on the second signature, the accuracy of the second data.

* * * * *